No. 766,807. PATENTED AUG. 9, 1904.
J. M. BRYANT.
THILL COUPLING.
APPLICATION FILED AUG. 3, 1903.
NO MODEL. 2 SHEETS—SHEET 1.
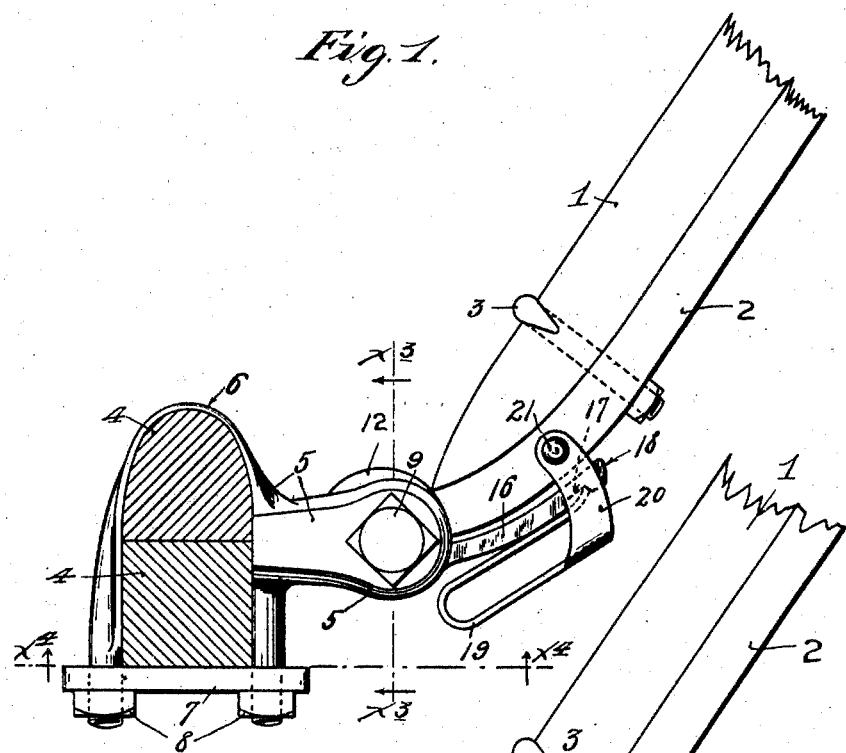
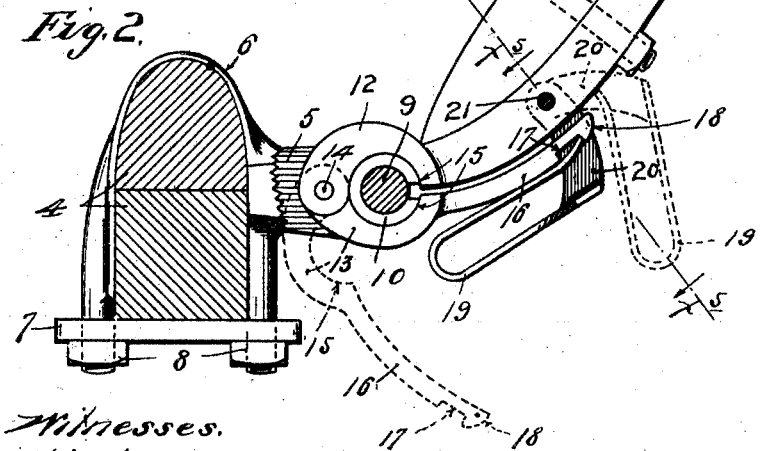
Witnesses.
N. S. Kilgore
L. H. Opsahl.
Inventor:
John M. Bryant.
By his Attorneys.
Williamson & Merchant

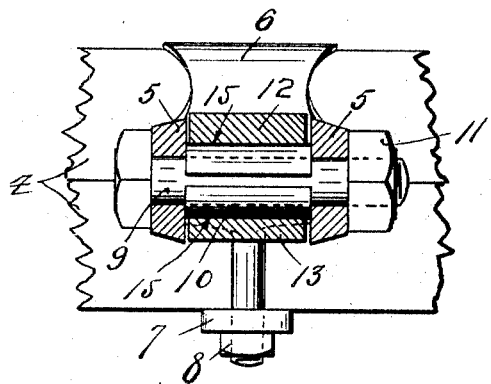
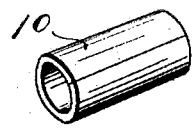
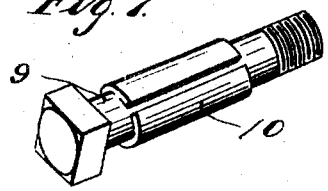
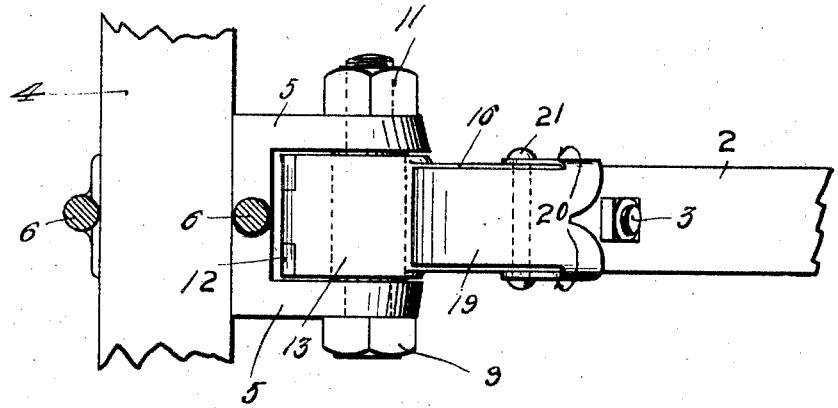
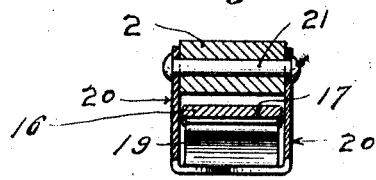

No. 766,807.                                                    Patented August 9, 1904.

UNITED STATES PATENT OFFICE.

JOHN M. BRYANT, OF DETROIT, MICHIGAN.

THILL-COUPLING.

SPECIFICATION forming part of Letters Patent No. 766,807, dated August 9, 1904.

Application filed August 3, 1903. Serial No. 167,975. (No model.)

*To all whom it may concern:*

Be it known that I, JOHN M. BRYANT, a citizen of the United States of America, residing at Detroit, in the county of Wayne and State of Michigan, have invented certain new and useful Improvements in Thill-Couplings; and I do hereby declare the following to be a full, clear, and exact description of the invention, such as will enable others skilled in the art to which it appertains to make and use the same.

My present invention has for its object to provide an improved coupling for thills, poles, &c.; and to this end it consists of the novel devices and combinations of devices hereinafter described, and defined in the claims.

In the accompanying drawings, which illustrate my invention, like characters indicate like parts throughout the several views.

Figure 1 is a view principally in side elevation, but with some parts sectioned, showing a portion of a pair of thills and the front axle of a vehicle, the said parts being connected by one of my improved couplings. Fig. 2 is a similar view to Fig. 1, but with some parts sectioned and with certain of the parts of the coupling indicated in opened positions by dotted lines. Fig. 3 is a transverse section on the line $x^3$ $x^3$ of Fig. 1. Fig. 4 is a horizontal section on the line $x^4$ $x^4$ of Fig. 1. Fig. 5 is a transverse section on the line $x^5$ $x^5$ of Fig. 2. Fig. 6 is a perspective view of the split spring-bushing of the coupling, and Fig. 7 is a perspective view showing the spring-bushing applied on the pivot-bolt of the coupling.

The numeral 1 indicates a portion of the thills to which one of a pair of metallic straps 2 is rigidly secured in the ordinary or any suitable way—as, for instance, by means of one or more nutted bolts 3.

The numeral 4 indicates the front axle of a vehicle. This axle is provided with an ordinary bifurcated thill-coupling bracket 5, which is secured to said axle in the ordinary or any suitable way—as, for instance, by means of a yoke 6, formed integral therewith, and a coöperating clamping-bar 7 and nuts 8.

A pivot-bolt 9 is passed through perforations in the ears of the bracket 5. On this bolt 9 is placed a split bushing 10 of spring metal, preferably of brass or any other metal which will wear well against steel and iron. This spring metallic bushing constitutes an important feature of my present invention, and its function will be further noted later on in this description. On the projecting screw-threaded end of the bolt 9 is a nut 11.

As shown, the coupling involves a pair of jaws 12 and 13, pivotally connected at 14 and provided with coöperating semicylindrical seats 15, that fit the outer surface of the split bushing 10. Also, as shown, the jaw 12 is formed integral with the strap or iron 2. The pivoted lower jaw 13 is provided with a projecting arm or extension 16, formed near its free end with a notch 17 and beveled at its extreme free end, as shown at 18. The clamping-jaws 12 and 13 are held in their closed or clamping positions, with their seats 15 pressing the bushing 10, by means of a lock-lever of novel construction. This lock-lever is in the form of a quite strong U-shaped spring 19, formed at one end with a pair of long ears 20, that are pivotally attached to the metallic strap 2 or, what is the same thing, to the projecting portion of the jaw 12 by a rivet or small bolt 21. The free end of the U-shaped spring-section of the lock-lever is curved slightly outward, so that it may engage with the notch 17 of the jaw-arm 16 when the said lever is in a locking position, as shown by full lines in Figs. 1 and 2. Furthermore, by reference to said views it will be noted that the said curved free end of the said spring-section 19 projects between the ears 20, which protect the said spring and prevent the free end thereof from being engaged by parts with which it is not intended for engagement. When the movable jaws in the said lock-lever are moved into position indicated by dotted lines in Fig. 2, it is evident that the thills may be applied in working position or removed therefrom. To lock the jaws of the coupling together when the thills are in working position, the lower jaw is of course forced upward against the bushing 10 and the lock-lever is forced downward and rearward into the position indicated by full lines in Fig. 2, under which movement the curved free end of the spring-section 19 passes over the beveled end 18 of the jaw-arm 16 and springs into the notch 17 thereof, thus securely holding the said lock-lever in an operative or locking position. To release the pivoted jaw 13 from the relatively fixed jaw 12, the lock-lever is forced back into the position indicated by dotted lines in Fig. 2, under which movement the spring-section 19 is bent backward, so as to permit the lock-lever to be thrown forward of a dead-center and thereafter to spring the curved free end thereof forward out of the notch 17 and over the beveled end or lug 18 of the arm 16. In practice this lock-lever has been found very efficient for the purposes had in view. It is comparatively cheap to make and has the advantage that the entire lever is made from a single piece of metal stamped and bent to the proper form.

Returning now to the construction and function of the split metallic bushing 10, it may be further stated that the same is preferably made of such diameter that the bolt 9 in being driven through the same will spring the said bushing so that its split edge will be separated more or less, thus causing the bushing to tightly clamp the bolt. In adjusting the device for use the jaws 12 and 13 should be clamped onto the bushing while the nut 11 of the pivot-bolt 9 is loose. This insures the closest possible engagement of the split metallic bushing with the said pivot-bolt. Then while the bushing is thus clamped the nut 11 is tightened onto the bolt 9, and the ears of the bifurcated coupling-bracket 6 are thus tightly drawn onto or against the ends of the split bushing. By reference to Fig. 3 it will be noted that the split bushing 10 is of such length that when the ears of the bracket 6 are drawn tightly against the same there will be play or clearance between the said ears and the sides of the coupling-jaws 12 and 13. Now it will be seen when the nut 11 is tightened, as described, the split metallic bushing 10 serves, first, to space apart the ears of the coupling-bracket 6, and, second, being itself firmly held clamped against the bolt 9 by the said ears serves as a bolt-lock to prevent turning of the bolt. Furthermore, with the nut tightened against the ears and with the ears tightly pressed against the ends of the bushing a jam-nut or other device is not necessary to prevent turning of the nut 11. It thus becomes evident that the split metallic bushing is an important feature in a coupling of this character. The said bushing, as already indicated, may be constructed of various metals, but must be made of metal, for the reason that it must be rigid against clamping-springs thereon from the ears of the bracket which are pressed against the same and must be capable of firmly holding the pivot-bolt against rotation. It is of course evident from what has been said that the said split metallic bushing will hold the said bolt against rotation in the ears of the coupling-bracket; but the fact may be stated in another way—to wit, that the said bushing frictionally holds the bolt against rotation with respect thereto and the pressure or friction between the said bushing and the ears holds said bushing against rotation with respect to said ears.

It will of course be understood that the coupling described is capable of modification within the scope of my invention as herein set forth and claimed.

What I claim, and desire to secure by Letters Patent of the United States of America, is as follows:

1. A coupling-bracket having laterally-spaced ears, a nutted bolt passed through said ears, and a spring-metal bushing clamping said bolt under its own spring tension and with its split edges always spaced apart, said split spring-bushing having sufficient endwise rigidity to form a positive unyielding stop against which said ears may be clamped by said nutted bolt, in combination with a thill-coupling comprising a pair of jaws having seats fitting said bushing, and a spring-lock yieldingly pressing said jaws onto said sleeve, substantially as described.

2. A thill-coupling comprising a pair of pivotally-connected jaws, the movable member of said jaws having a detent or lug at its free end, and a lock-lever made up of the U-shaped spring-section 19 having rigidly secured thereto at one end the ears 20 pivotally connected to the relatively fixed jaw, the free end of said U-shaped spring-section being engageable and disengageable with the detent or lug on the free end of said movable jaw, to lock and release the latter, substantially as described.

In testimony whereof I have affixed my signature in presence of two witnesses.

JOHN M. BRYANT.

Witnesses:
F. D. MERCHANT,
ROBERT C. MABEY.